United States Patent
Wurmb et al.

[11] 3,962,172
[45] June 8, 1976

[54] GLASS FIBER REINFORCED POLYAMIDE MOLDING MATERIAL OF HIGH IMPACT STRENGTH

[75] Inventors: Rolf Wurmb, Heidelberg; Peter Freyberg, Speyer; Kurt Wendel; Wolfgang Schwarz, both of Ludwigshafen, all of Germany

[73] Assignee: BASF Aktiengesellschaft, Ludwigshafen, Germany

[22] Filed: Sept. 3, 1974

[21] Appl. No.: 502,664

[30] Foreign Application Priority Data
Sept. 14, 1973  Germany............................ 2346310

[52] U.S. Cl.............................. 260/37 N; 427/407; 428/395
[51] Int. Cl.².................... C08K 7/14; C08K 9/04
[58] Field of Search................ 260/37 N; 428/395; 427/407

[56] References Cited
UNITED STATES PATENTS
3,516,961  6/1970  Robb .................................. 260/37 N
3,640,943  2/1972  Bostick et al. .................... 260/37 N
3,654,219  4/1972  Boger................................. 260/37 N Primary Examiner—Donald E. Czaja
Assistant Examiner—S. M. Person
Attorney, Agent, or Firm—Johnston, Keil, Thompson & Shurtleff

[57] ABSTRACT

Glass fiber reinforced polyamide molding material of high impact strength which contains:
a. from 40 to 90 parts by weight of a polyamide; and
b. from 10 to 60 parts by weight of glass fibers coated with a film-forming polymer containing from 4 to 50% by weight of units of the general formula:

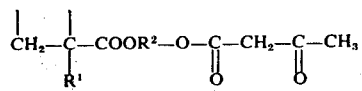

in which $R^1$ is hydrogen or alkyl of one to five carbon atoms and $R^2$ is a saturated divalent hydrocarbon radical of two to ten carbon atoms; with or without
c. a conventional stabilizer, flame retardant, pigment, filler or other additive.

5 Claims, No Drawings

GLASS FIBER REINFORCED POLYAMIDE MOLDING MATERIAL OF HIGH IMPACT STRENGTH

This application discloses and claims subject matter described in German Patent application P 23 46 310.7 filed Sept. 14, 1973 which is incorporated herein by reference.

Polyamides, particularly those which have been prepared by polycondensation of an omega-aminocarboxylic acid or of an aliphatic diamine and a dicarboxylic acid, are advantageously used because of their great toughness for the production of engineering parts which are to be subjected to high mechanical stress. The stiffness of the polyamides is however inadequate for many applications and therefore they have for some time been reinforced by the incorporation of glass fibers. Although adding glass fibers markedly increases stiffness, impact strength is substantially decreased at the same time.

Glass fibers used for reinforcement are as a rule treated with a coupling agent, usually an alkylsilane which contains at least one group on the silicon atom which is hydrolyzable to SiOH so that good adhesion to the glass is achieved and which also has a further functional group in the alkyl radical which ensures good adhesion to the polyamide. Triethoxy-γ-aminopropylsilane is a silane which is often used.

The glass fibers have to be coated however with a protective film to ensure good incorporation and to protect them from mechanical damage. The film should satisfy the following requirements:

a. combination of individual fibers to a roving so that good processability is ensured;
b. improvement in the adhesion between glass fibers and plastics;
c. increase in the wettability of the glass by the polymer; and
d. prevention of electrostatic charging during processing of the fibers.

It has been found however that commercially available film-forming substances based on starch, polyvinyl acetate or polyesters have a negative effect on the mechanical level and particularly the impact strength of polyamides reinforced with glass fibers finished in the said way.

The present invention has as its object the provision of glass fiber reinforced polyamide molding material which has high impact strength. This object is achieved by the use of glass fibers which have been coated with a film-forming polymer which is capable of forming complexes by acetoacetic ester groupings. Such a polymer contains from 4 to 50% by weight of units of an alkanediol acrylate acetylacetate in polymerized form, the alkanediol having from 2 to 10 carbon atoms and the acrylate group if desired bearing alkyl of up to five carbon atoms as a substituent in the α-position.

The invention accordingly consists in a glass fiber reinforced polyamide material of high impact strength which contains:

a. from 40 to 90 parts by weight of a polyamide: and
b. from 10 to 60 parts by weight of glass fibers which have been coated with a film-forming polymer which contains from 4 to 50% by weight of units of the general formula (I):

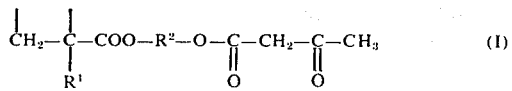

in which
R$^1$ is hydrogen or alkyl of one to five carbon atoms and
R$^2$ is a saturated divalent hydrocarbon radical of two to ten carbon atoms; with or without
c. a conventional stabilizer, flame retardant, pigment, filler or other additive.

The raw material used for the molding material may be a conventional polyamide, particularly one which has been prepared by polycondensation of an ω-aminocarboxylic acid, for example one of six to twelve carbon atoms such as ε-aminocaproic acid or ω-aminodecanoic acid or the corresponding cyclic lactams such as caprolactam, capryllactam or laurolactam, or an aliphatic or aromatic diamine with a dicarboxylic acid. Examples of suitable diamines are hexamethylenediamine, decamethylenediamine and p-diaminobenzene. Suitable dicarboxylic acids include for example adipic acid, sebacic acid, decanedicarboxylic acid and terephthalic acid. Preferred polyamides are polycaprolactam and the condensation product of hexamethylenediamine and adipic acid known as nylon-6.6. Mixed polycondensates and mixtures of polyamides may also be used as polyamide components.

The polyamides preferably have relative viscosities (measured in 96% sulfuric acid, C = 1 g/100 ml of solution at 25°C) of from 2.0 to 4.5 and preferably from 2.6 to 4.5

All glass fibers conventionally used as reinforcement for plastics are suitable as glass fibers. They usually have a mean length of from 0.1 to 1.0 mm and preferably from 0.2 to 0.5 mm and a diameter of from 5 to 20 microns and preferably from 8 to 15 microns. Continuous filaments may be used at the start and these are appropriately comminuted during the process of being mixed with the polyamide; it is also possible however to add comminuted glass fibers to the polyamide.

It is an essential feature of the molding material according to the present invention that the glass fibers are coated with a film-forming polymer which contains from 4 to 50% and preferably from 10 to 30% by weight of units of the general formula (I).

Suitable film-forming polymers are conveniently used in the form of polymer dispersions or polymer solutions. The units of formula (I) are introduced into the polymer chain by the use of monomers of the type of alkanediolacrylate-acetyl acetate; the alkanediol has from two to ten and preferably two to six carbon atoms and the acrylate group may optionally bear alkyl of up to five carbon atoms as a substituent in the α-position. Examples of such monomers are ethylene glycol, 1,3-propylene glycol, butanediol, hexanediol and decanediol acrylate-acetylacetates and the corresponding methacrylate-acetylacetates. The remaining portion of the unit of the film-forming polymer is derived from a conventional monomer which contains a polymerizable olefinic double bond such as an olefin (for example ethylene), a diolefin (for example butadiene) styrene or a substituted styrene, an aliphatic ester of vinyl alcohol such as vinyl acetate or propionate, an unsaturated carboxylic acid or derivative of the same such as acrylic acid, methacrylic acid, methacrylic acid, maleic acid or ester of the same such as butyl acrylate, methyl methacrylate, acrylamide or acrylonitrile.

Styrene, acrylonitrile and acrylic esters of alkanols of one to eight carbon atoms are preferred as monomers.

Advantageous film-forming polymers may contain for example from 40 to 90% by weight of an acrylate, from 1 to 30% by weight of acrylonitrile and/or acrylic acid in addition to the alkanediolacrylate-acetylacetate.

The film-forming polymer should contain from 4 to 50% and preferably from 10 to 40% by weight of units of formula (I). It may be prepared by a conventional method of solution or emulsion polymerization, for example as described in Houben-Weyl, "Methoden der organischen Chemie", edition IV, volume XIV/1 (Makromolekulare Stoffe, part 1), Georg Thieme Verlag, Stuttgart.

The film-forming polymer is used in only a small amount. A coating on the glass fibers of about 1% of their weight is adequate as a rule and the amount is generally from about 0.1 to 10%. The optimal amount for a given type of glass fiber may easily be determined by experiment.

In addition to the film-forming polymer it is convenient to use, as a coupling agent, a silane such as triethoxy-γ-aminopropylsilane, N-β-(aminoethyl)-γ-aminopropyltrimethoxysilane or a conventional lubricant such as an oxyalkylated alcohol.

The dispersions or solutions containing the film-forming polymer have as a rule a solids content of from 20 to 50%. These are diluted prior to application to the glass fibers to the necessary concentrations and any silanes used as coupling agents and any other additives such as lubricants are also added. Application of the dispersions to the glass fibers may be carried out in any suitable way immediately after the glass filaments have been drawn from the melt. The glass fibers may however be first spooled and treated in a second operation with the size according to the invention.

Molding material according to the present invention contains for each 40 to 90 parts by weight of a polyamide from 10 to 60 parts by weight of coated glass fibers and preferably from 15 to 50 parts by weight of glass fibers for from 50 to 85 parts by weight of a polyamide.

The molding material may also contain conventional stabilizers, flame retardants, pigments, fillers and other additives.

The production of the moleding material is carried out in the conventional manner by mixing the components at a temperature above the melting point of the polyamide.

Incorporation of the coated glass fibers and any additives into the polyamide may be carried out by a conventional method, for example by processing on screw extruders, the glass fibers being used as continuous rovings or as chopped strands which are drawn into the molten polymer. In this step the glass fibers are comminuted and thereafter have an average length of for example from 0.2 to 0.5 mm. Rovings treated according to the invention may however also be laid down as a web and then coated with molten polyamide.

The following Examples will illustrate the invention.

EXAMPLES

A 45% aqueous dispersion of a copolymer of n-butyl acrylate, acrylonitrile, acrylic acid and butanediol acrylate-acetylacetate is prepared by a conventional method using 2% of a conventional sulfonated oxyethylated isooctylphenol as emulsifier at 80°C.

This dispersion is diluted to a solids content of 5% and then 5% (based on the dispersion) of triethoxy-γ-aminopropylsilane is added. The continuous rovings are passed through an impregnating liquor containing the above dispersion and then passed through a suitable drying tower. The coating determined by loss on ignition generally amounts to about 1% based on the amount of glass.

Glass fibers coated in this way are drawn into the molten ε-polycaprolactam (nylon-6) in a double screw extruder by a conventional method (for example according to the method of U.S. Pat. No. 3,304,282), and the strand obtained is granulated and then processed into the desired molding material.

The content of glass in the reinforced materials is from 10 to 60% by weight and the mean length of the glass fibers is from 0.2 to 0.5 mm.

Results of some experiments are tabulated below:

Table 1

Mechanical values after incorporating sized glass fibers into ε-caprolactam.

| Size | GC | TS | IS |
|---|---|---|---|
| none | 34.7 | 1564 | 37.2 |
| PVA | 35.2 | 1612 | 35.1 |
| ES | 34.8 | 1595 | 36.3 |
| A | 35.6 | 1611 | 55.7 |
| B | 35.2 | 1670 | 49.3 |
| C | 35.5 | 1706 | 47.6 |
| D | 35.4 | 1626 | 50.8 |
| E | 35.1 | 1600 | 52.2 |

(Abbreviations: GC = glass content; TS = tensile strength in kg/cm² according to DIN 53,455; IS = impact strength in cm kg/cm² according to DIN 53,543; PVA = polyvinyl acetate; ES = epoxide size).
In each case the amount of size is about 1%.

Table 2

Composition of the sizes: BA = butyl acrylate; AN = acrylonitrile; AA = acrylic acid; BD = butanediol-monoacrylate-acetylacetate:

| | BA | AN | AA | BD |
|---|---|---|---|---|
| A | 55 | 5 | 2 | 40 |
| B | 75 | 5 | 2 | 20 |
| C | 65 | 15 | 2 | 20 |
| D | 55 | 25 | 2 | 20 |
| E | 85 | 5 | 2 | 10 |

We claim:

1. A glass fiber reinforced polyamide molding material of high impact strength which contains:
   a. from 40 to 90% by weight of a polyamide: and
   b. from 10 to 60% by weight of glass fibers which have been coated with a film-forming polymer containing from 4 to 50% by weight of units of the formula

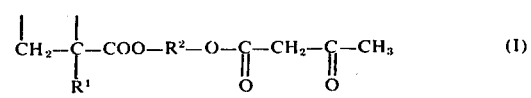

(I)

in which R¹ is hydrogen or alkyl of one to five carbon atoms and R² is a saturated divalent hydrocarbon radical of two to ten carbon atoms, said coating being from about 0.1 to 10% by weight based on the weight of the coated fibers; with or without
   c. a conventional stabilizer, flame retardant, pigment, filler or other additive.

2. A polyamide molding material as claimed in claim 1 wherein the polyamide has a relative viscosity of from 2.0 to 4.5.

3. A polyamide molding material as claimed in claim 1 wherein the glass fibers have a mean length of from 0.1 to 1.0 mm.

4. A polyamide molding material as claimed in claim 1 wherein the glass fibers have a diameter of from 5 to 20 microns.

5. A polyamide molding material as claimed in claim 1 wherein the film-forming polymer contains from 40 to 90% by weight of an acrylate, from 1 to 30% by weight of acrylonitrile and/or acrylic acid in addition to the units of the general formula (I).

* * * * *